(12) United States Patent
Schimke (10) Patent No.: US 7,824,293 B2
(45) Date of Patent: Nov. 2, 2010

(54) VEHICLE TRANSMISSION

(75) Inventor: Martin Schimke, Redgranite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 518 days.

(21) Appl. No.: 11/904,915

(22) Filed: Sep. 28, 2007

(65) Prior Publication Data

US 2009/0088283 A1 Apr. 2, 2009

(51) Int. Cl.
*F16H 37/08* (2006.01)
*F16H 3/44* (2006.01)

(52) U.S. Cl. .............. 475/200; 475/204; 475/298; 475/302

(58) Field of Classification Search ........ 475/200, 475/203, 204, 206, 221, 298, 302, 317
See application file for complete search history.

(56) References Cited

U.S. PATENT DOCUMENTS

| | | | |
|---|---|---|---|
| 2,896,479 A | 7/1959 | Kelbel | |
| 3,311,186 A | 3/1967 | Kamlukin | |
| 3,999,447 A | 12/1976 | Halberg | |
| 4,063,470 A | 12/1977 | Kelbel | |
| 4,074,591 A | 2/1978 | Dick | |
| 4,417,642 A * | 11/1983 | Suzuki et al. | 180/249 |
| 4,428,452 A * | 1/1984 | Muraoka et al. | 180/249 |
| 4,462,274 A * | 7/1984 | Reppert et al. | 475/302 |
| 4,549,449 A * | 10/1985 | Miller et al. | 475/138 |
| 4,604,908 A | 8/1986 | Dolan | |
| 4,677,875 A * | 7/1987 | Batchelor | 475/85 |
| 5,046,998 A | 9/1991 | Frost | |
| 5,159,847 A | 11/1992 | Williams et al. | |
| 5,380,255 A | 1/1995 | Brissenden et al. | |
| 5,643,129 A * | 7/1997 | Richardson | 475/204 |
| 5,711,740 A | 1/1998 | Bakowski | |
| 6,117,036 A * | 9/2000 | Lanzon et al. | 475/204 |
| 6,117,038 A * | 9/2000 | Nishiji et al. | 475/221 |
| 6,354,173 B1 | 3/2002 | Pritchard et al. | |
| 6,652,407 B2 | 11/2003 | Ronk et al. | |
| 6,840,880 B2 * | 1/2005 | Glassner | 475/198 |
| 7,028,583 B2 | 4/2006 | Bennett | |
| 7,033,300 B2 | 4/2006 | Mueller et al. | |
| 7,303,502 B2 * | 12/2007 | Thompson | 475/296 |
| 2006/0142109 A1 | 6/2006 | Williams et al. | |

OTHER PUBLICATIONS

Nice, Karim, "How Gears Work," howstuffworks, printed from website http://science.howstuffworks.com/gear.htm/printable on May 22, 2007, 9 pages.

* cited by examiner

*Primary Examiner*—Roger Pang
(74) *Attorney, Agent, or Firm*—Foley & Lardner LLP (57) ABSTRACT

A transmission includes a first gear, and a second gear is fixed to one end of a shaft with the second gear engaging the first gear. A bevel gear is rotatably supported on the shaft and engages a power input gear. A hub is fixed to the bevel gear for concentric rotation about the shaft; the hub having a splined outer section. A planetary gear set including a sun gear and a carrier are arranged concentrically about the splined outer section of the hub. A splined section is fixed to an opposite end of the shaft. A collar assembly includes first and second collars, each having internal teeth and external teeth. The first collar and the second collar are axially coupled together and independently rotatable relative to one another, and the collar assembly slidably engages the splined section and the splined outer section.

25 Claims, 8 Drawing Sheets

VEHICLE TRANSMISSION

BACKGROUND

The present disclosure relates generally to the field of vehicle transmissions. The disclosure more specifically relates to the control of the power path through a transmission to provide multiple speeds in the transmission.

It would be desirable to provide an improved multi-speed vehicle transmission which provides more than one speed using a planetary gear drive arrangement. However, the problems posed by this type of arrangement are particularly complicated because they exist within the complexity of an overall vehicle system. For example, the inputs and outputs of a vehicle transmission experience the torque, speed and power oscillations caused by vehicle dynamics, varying suspension systems, road conditions, loading conditions, engine and motor torque and speed characteristics, operator control, etc. Accordingly, the selection of a solution may result in unforeseen shifting control complications, shifting linkage complications, cost increases, manufacturing efficiency losses, expensive part configurations, performance and control losses, etc. Further complicating the use of this type of transmission is the need to use such transmissions in hybrid vehicles which utilize electric motors for all or portions of the vehicle drive power.

SUMMARY

One embodiment of the invention relates to a two speed power transmission useable in the axle of a vehicle such as a hybrid drive vehicle. Such a transmission includes an output shaft which would be mechanically coupled to the differential of an axle, and a planetary gear set including a sun gear, a ring gear, planetary gears and a planetary gear carrier. The transmission also includes a coupling which is slidably engageable with an input shaft, the output shaft, the sun gear and the carrier. This coupling can be of a two-piece configuration, and fixes the input shaft to the output shaft when disengaged with the sun gear and carrier, and permits relative rotation of the shafts when engaged with the sun gear and carrier. A first speed is provided when the coupling fixes the shafts together, and the second speed is provided when the coupling is engaged with the sun gear and carrier and the shafts are permitted to rotate relative to each other.

DETAILED DESCRIPTION

Figure 1:
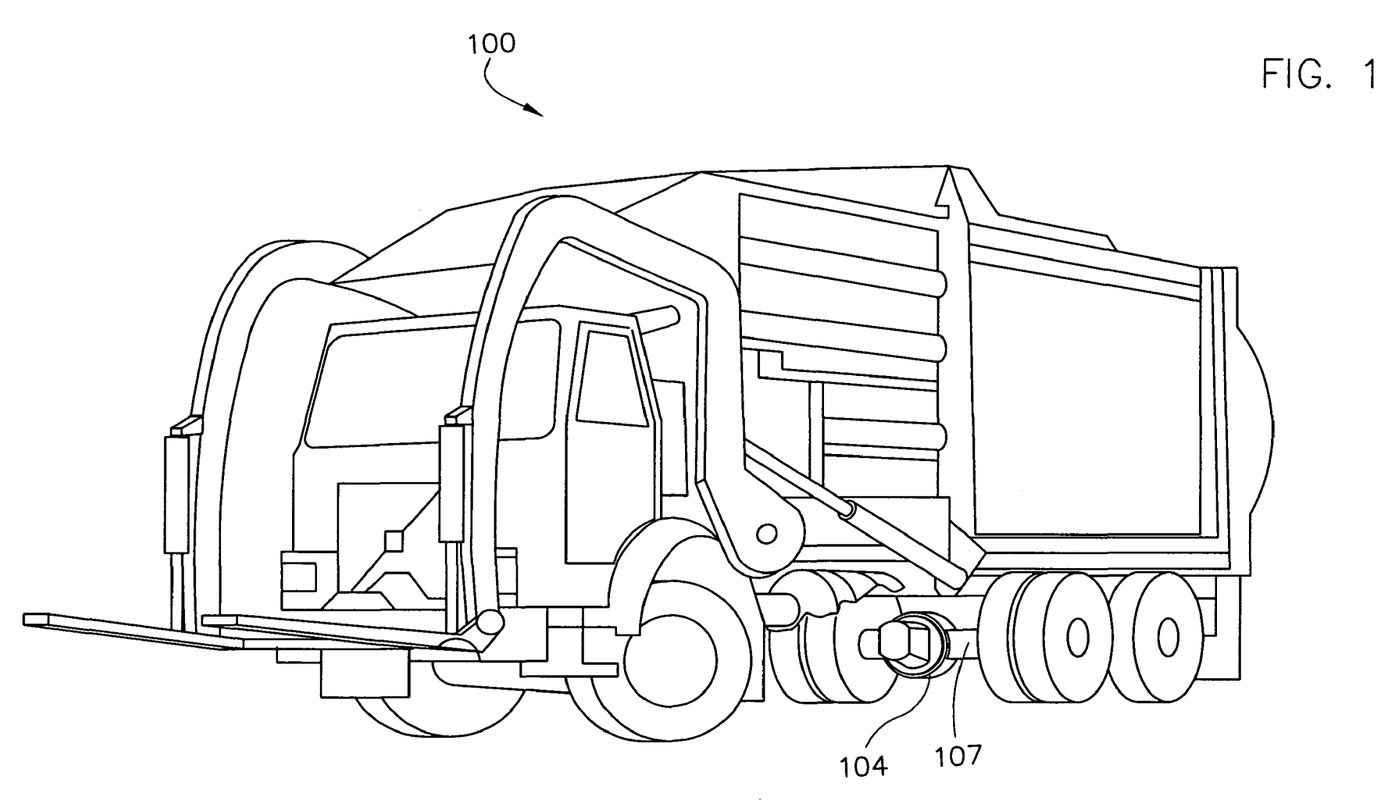
FIG. 1 is a perspective view of a vehicle including an axle housing that packages a transmission according to one exemplary embodiment.

Referring to FIG. 1, a hybrid vehicle 100, such as a refuse vehicle, is configured to collect and manage refuse (or other cargo). Refuse vehicle 100 typically includes at least one axle assembly 107 including axle shafts 102 (see FIG. 2) that may be configured for use with various suspension types (e.g., a walking beam suspension, independent suspension, an airbag suspension, etc.). It is noted that while the FIGS. 1 and 2 illustrate an axle assembly embodied on refuse vehicle 100, the axle assembly may be used on any conventional or hybrid drive vehicle (i.e., capable of electric and/or mechanical drive).

Figure 2:
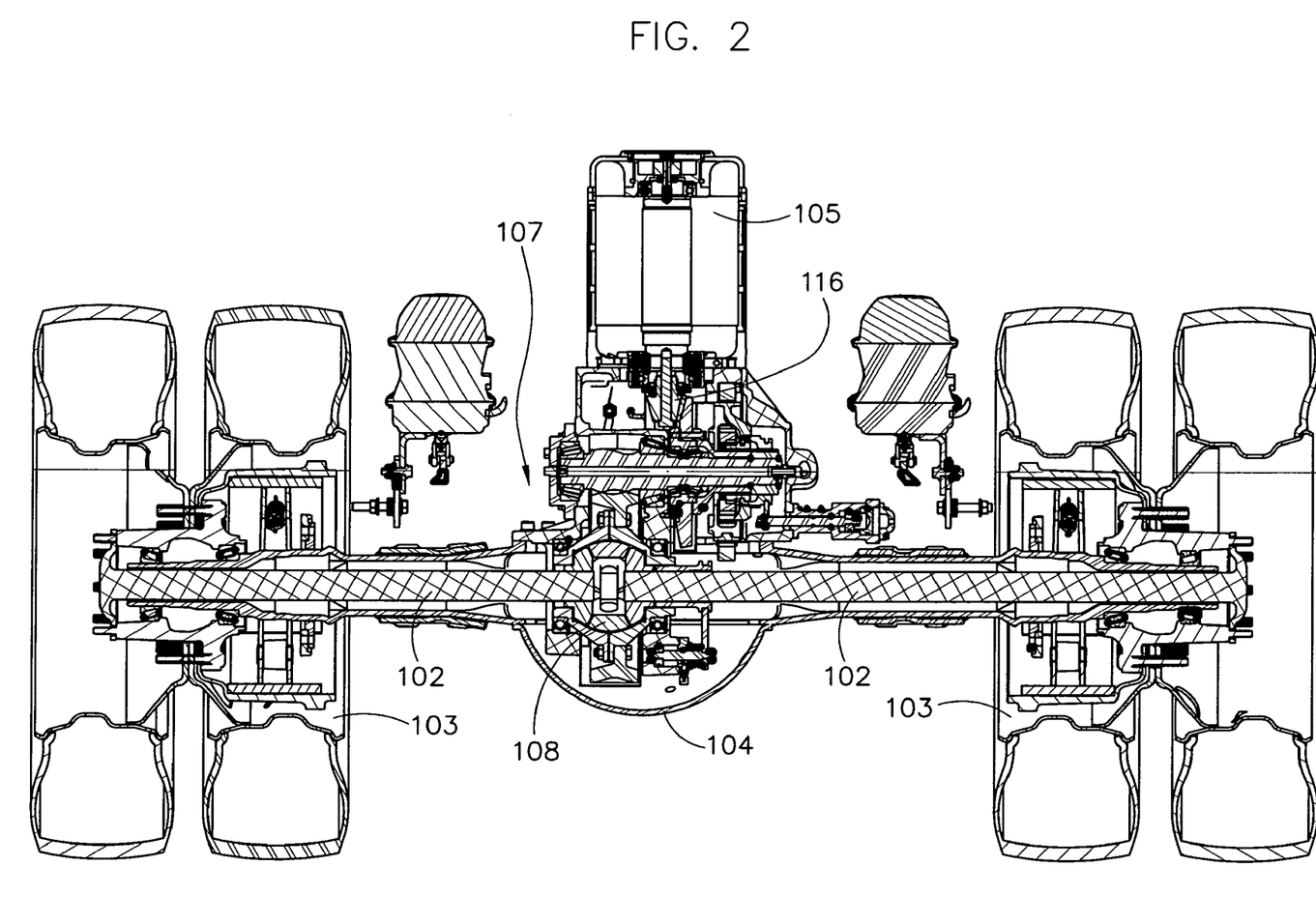
FIG. 2 is a sectional view of the transmission, motor, and wheel housing of the vehicle of FIG. 1 according to an exemplary embodiment.

Referring to FIG. 2, a transmission 104 may be configured for use with axle assembly 107. Transmission 104 receives power from a motor 105 (through a gear 116 shown attached to a shaft of motor 105) and transfers the power through a differential 108 to axle shafts 102. Axle shafts 102 in turn rotates one or more wheels 103 on each side of vehicle 100. While the figure illustrates two drive wheels coupled to an axle shaft 102 on each side of vehicle 100, according to another exemplary embodiment a single drive wheel may be coupled to axle shaft 102 on each side. According to still another exemplary embodiment, more than two wheels may be coupled to the axle shaft 102 on each side of vehicle 100. According to an alternative embodiment, the transmission may receive power from a drive shaft driven from an internal combustion engine or other suitable device.

Figure 3:
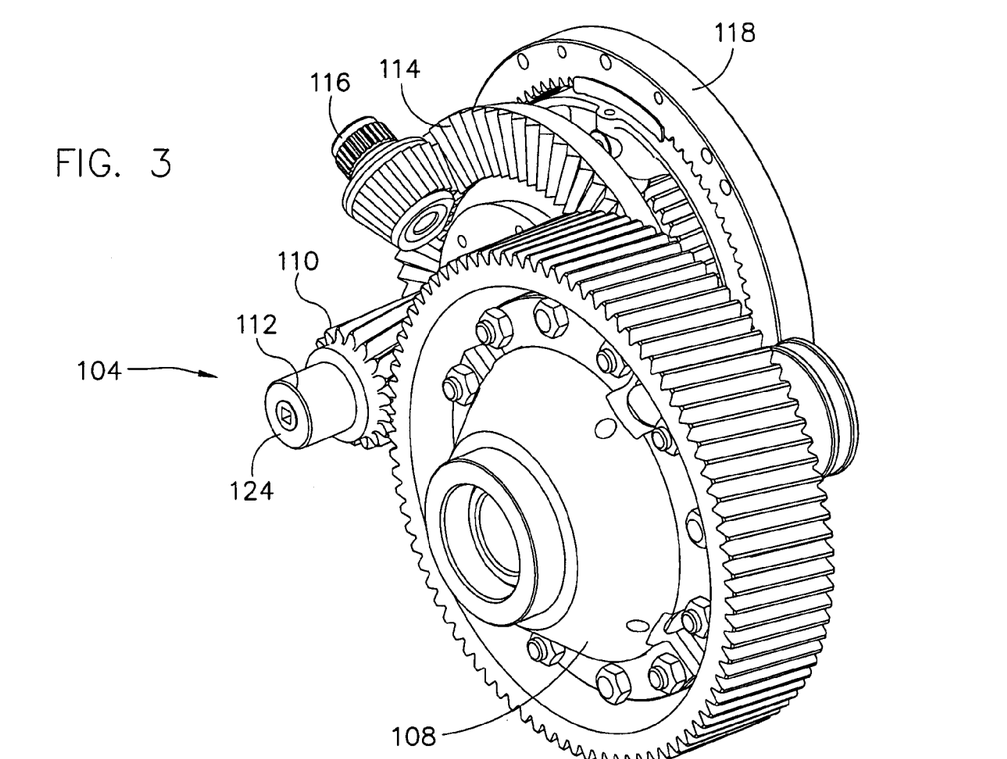
FIG. 3 is a perspective view of the transmission of FIG. 1 according to an exemplary embodiment.
Figure 4:
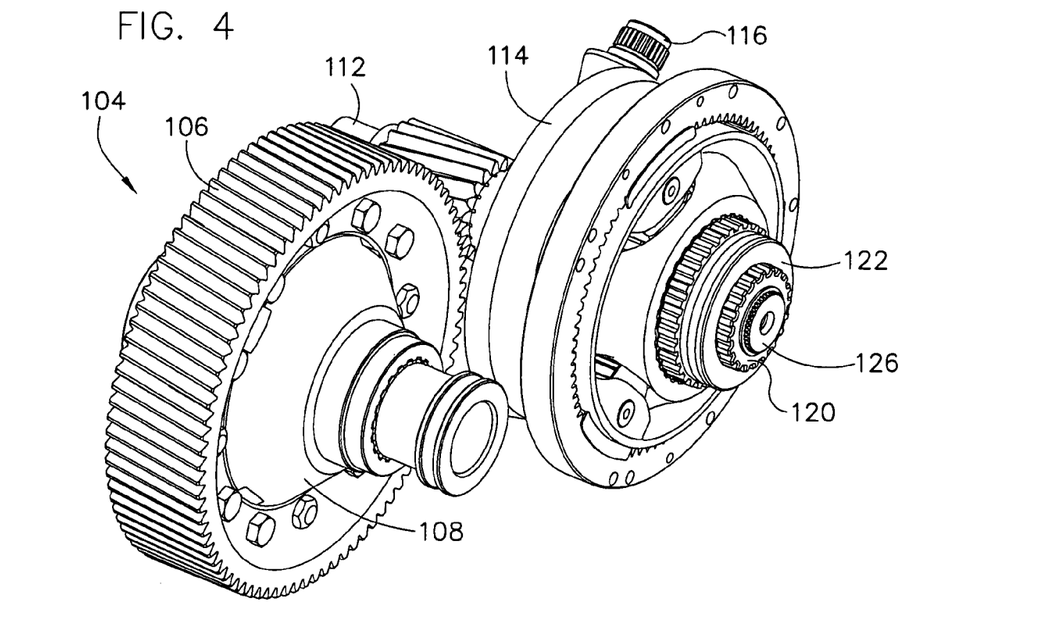
FIG. 4 is a perspective view of the transmission of FIG. 2 from another angle according to an exemplary embodiment.

Referring to FIGS. 3 and 4, transmission 104 includes a gear 110 (e.g. pinion gear, etc.) which engages a gear 106 (e.g. final drive gear, etc.) fastened to a differential 108. Differential 108 is rotatably supported within the transmission 104 by appropriate bearings (not shown). Differential 108 is coupled to axle shafts 102 which are coupled to the wheels of vehicle 100. Depending upon the application, wheel-end reduction units may be used to couple the axle shafts to the wheels. In addition to gear 110 which is fixed to a shaft 112, transmission 104 includes bevel gears 114 and 116, a planetary gear assembly 118, a splined section 120 fixed to shaft 112, and a collar assembly 122 (e.g., a coupling, etc.). Bevel gear 116 (shown as a power input gear) may be attached to an electric motor or engine directly or through a drive shaft. As explained in detail below, the power applied to gear 116 is transmitted through the transmission to differential 108 to move the vehicle.

By way of example, gears 106, 110 may have helical gear teeth configurations, and rotate about generally parallel axes. Gear 110 is fixed to shaft 112 at end 124 to transmit power from shaft 112 to gear 106. Shaft 112 is supported within the housing of axle assembly 107 by roller bearings to rotate about an axis which is substantially parallel to the axis of rotation of differential 108. Bevel gear 114 is supported upon shaft 112 which is supported relative to the housing by a pair of roller bearings so that the rotational axis of gear 114 is the same as that of gear 110. Bevel gear 116 is engaged with gear 114, and is rotationally supported relative to the housing by a drive shaft and bearings to rotate about an axis generally perpendicular with the axis of rotation of gear 114. The drive shaft attached to gear 116 may be driven by an engine, electric motor in the case of a hybrid vehicle, or other suitable device. Gear 114 further supports a splined hub 144 (see FIGS. 7-9), for example an input shaft, etc. In particular, hub 144 is bolted to gear 114 to rotate about shaft 112.

Figure 5:
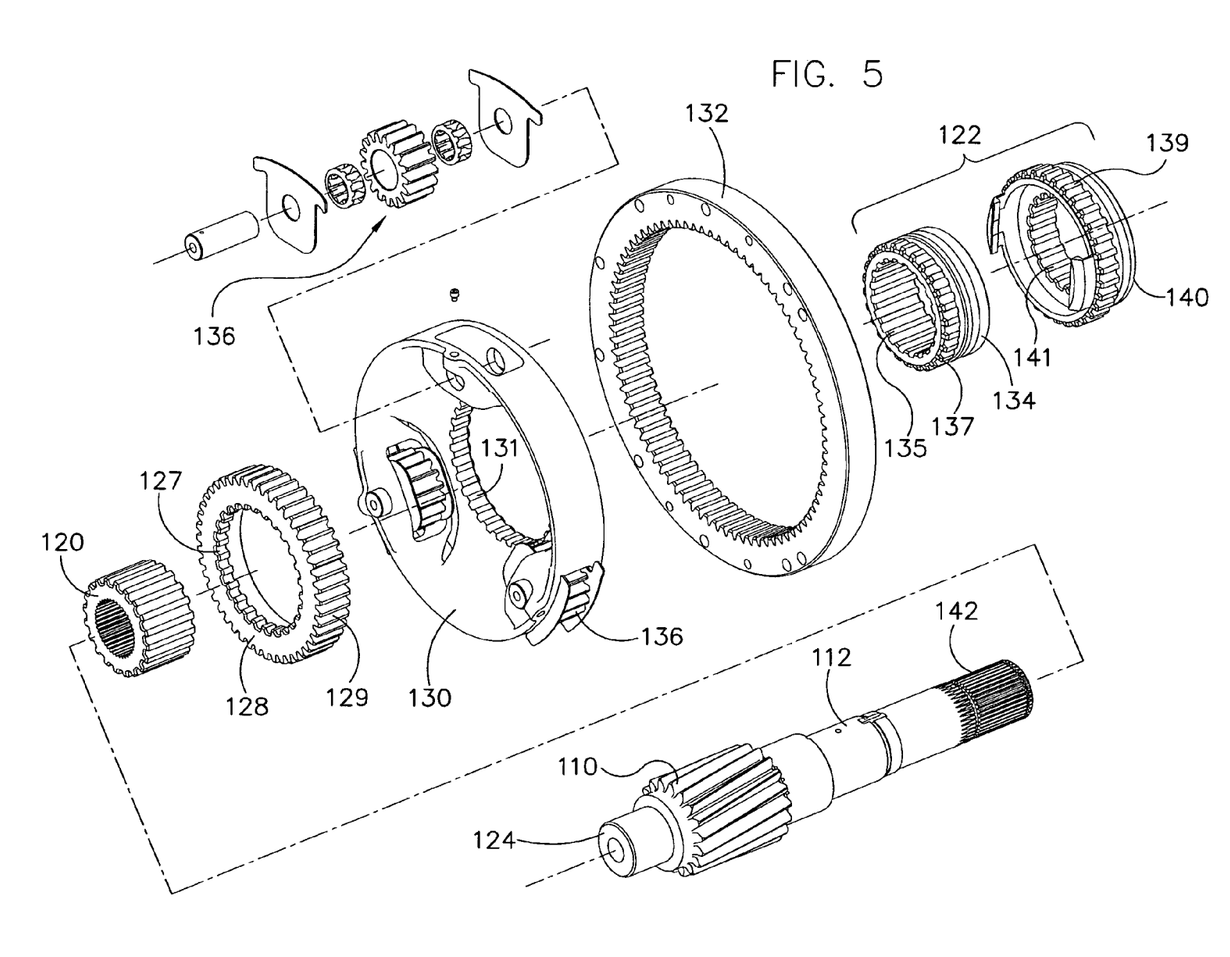
FIG. 5 is an exploded view of the transmission of FIG. 1 according to an exemplary embodiment.

Referring to FIG. 5, a splined section 120 is mated (e.g. pressed fit, etc.) to splines 142 of shaft 112. In particular, section 120 includes external splines which are similar in size and shape to splines 145 on an outer portion of hub 144 (see FIGS. 7-9) so that they may be axially aligned with one another. Section 120 includes internal splines which are configured to engage with splines 142 on shaft 112 with enough interference to prevent movement of section 120 relative to shaft 112.

Referring again to FIG. 5, planetary gear set 118 includes a sun gear 128, a carrier 130, three planetary gears 136 rotatably attached to carrier 130 by appropriate pins and bearings, and ring gear 132. Sun gear 128 is located within carrier 130 so that gear teeth 129 of sun gear 128 are engaged with the gear teeth of all three planetary gears 136. Ring gear 132 is fixed to the housing of axle assembly 107 and includes gear teeth which are engaged with the gear teeth of all three planetary gears 136.

Figure 6:
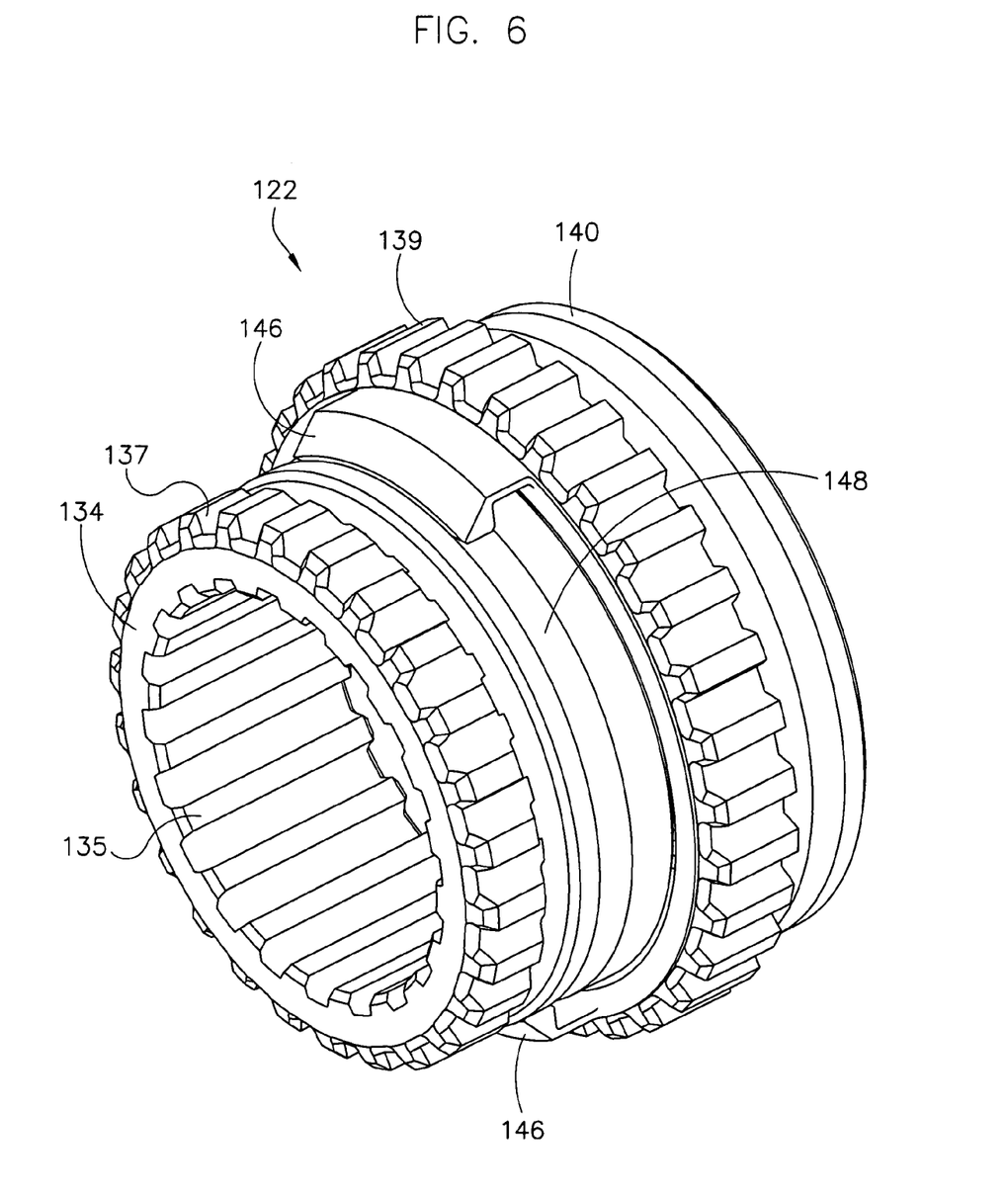
FIG. 6 is a perspective view of a collar assembly of the transmission of FIG. 1 according to an exemplary embodiment.

The structure with which power is transmitted from splined hub 144 either directly to shaft 112 or indirectly to shaft 112 through planetary gear set 118 will now be described in reference to FIGS. 5 and 6. In particular, the structure includes a two-piece collar assembly 122 (e.g., a coupling, etc.). Assembly 122 includes a first collar 134 and a second collar 140. Collars 134 and 140 both include internal teeth 135 and 141, respectively, which are similar in size and shape to and configured to mate with the splines 145 on the outer section of hub 144 and splined section 120. Collar 134 includes external teeth 137 which are configured to engage with internal teeth 127 of sun gear 128, and collar 140 includes external teeth 139 which are configured to engage with internal teeth 131 of carrier 130. Collar 134 further includes a circumferential groove 148 which is engaged by flanges 146 (e.g., hooks, etc.) of collar 140. Flanges 146 are slid into groove 148 before the collars are slid onto the splines of hub 144 and splined section 120. Flanges 146 and groove 148 allow second collar 140 rotate independently around collar 134. While the figure illustrates the use of two flanges 146, according to other exemplary embodiments, more or fewer flanges could be used as long as second collar 140 is both coupled to and rotatable relative to collar 134.

Figure 7:
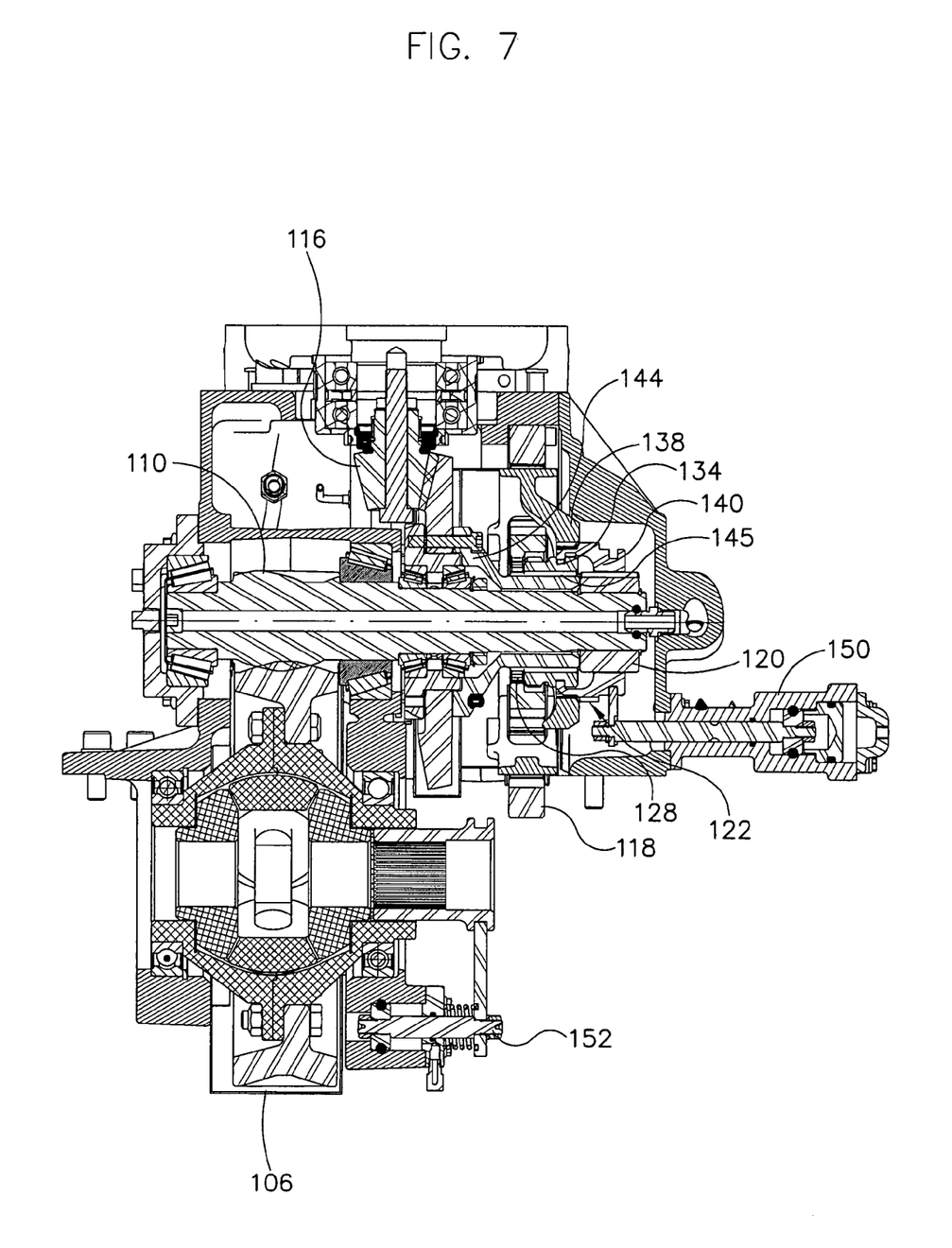
FIG. 7 is a sectional view of the transmission of FIG. 1 in a neutral position according to an exemplary embodiment.

Referring to FIG. 7, which illustrates a "neutral" position of the transmission, assembly 122 is positioned relative to shaft 112 so that the splines of collar 134 are engaged solely with the splines 145 of hub 144 and external teeth 137 are not engaged with internal teeth 127 of sun gear 128. In this position, teeth 141 of collar 140 are engaged solely with the splines of section 120, and teeth 139 are not engaged with internal teeth 131 of carrier 130. In this position, collar 134 rotates while collar 140 is idle, and no power is transmitted from gear 114 through planetary set 118 to shaft 112, or directly from gear 114 to shaft 112.

Figure 8:
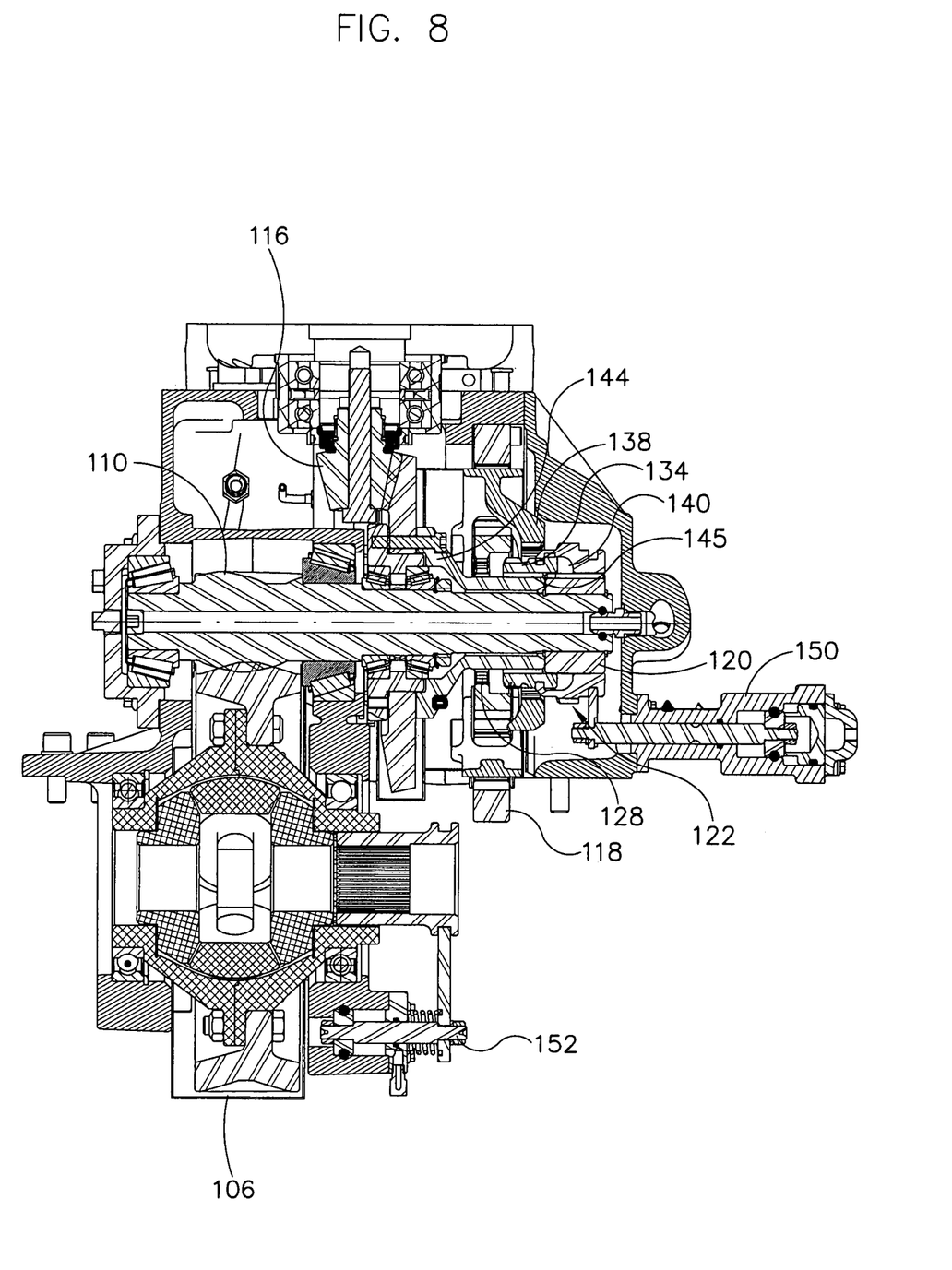
FIG. 8 is a sectional view of the transmission of FIG. 1 in a high speed position according to an exemplary embodiment.

Referring to FIG. 8, which illustrates a "high speed" position of the transmission, assembly 122 is positioned so that there is a direct drive (i.e. no speed difference between) from hub 144 to shaft 112. In particular, assembly 122 is slid to a position where the internal teeth 135 of collar 134 engage both the outer splines 145 of hub 144 and section 120 to fix gear 114 relative to shaft 112. Furthermore, the external teeth of collars 134 and 140 are disengaged from the internal teeth of sun gear 128 and carrier 130, respectively, thus removing the planetary gear set from the flow of power.

Figure 9:
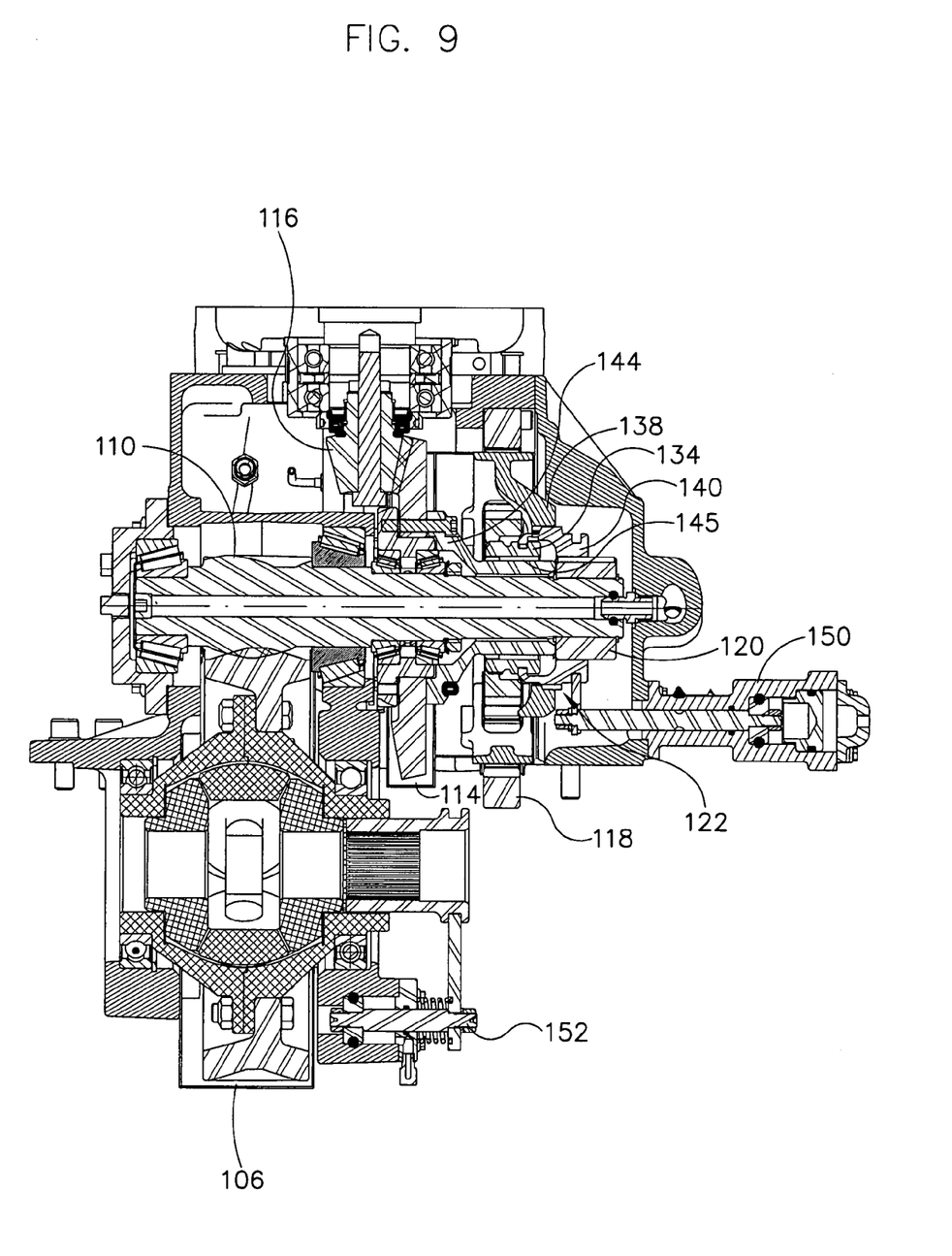
FIG. 9 is a sectional view of the transmission of FIG. 1 in a low speed position according to an exemplary embodiment.

Referring to FIG. 9, which illustrates a "low speed" position of the transmission, assembly 122 is positioned relative to shaft 112 so that the teeth 135 of collar 134 are engaged solely with the outer splines 145 of hub 144 and external teeth 137 are engaged with internal teeth 127 of sun gear 128. In this position, teeth 141 of collar 140 are engaged solely with the splines of section 120, and external teeth 139 of collar 140 are engaged with internal teeth 131 of carrier 130. In this position, collars 134 and 140 rotate relative to each other, and transmit power from gear 114 through planetary set 118 to shaft 112. This provides a torque multiplication of approximately 2.74 between gear 114 and shaft 112, and a speed reduction ratio of approximately 2.74:1.

Referring to the FIGURES as a whole, when power is provided by a power output source, such as electric motor 105 to rotate bevel gear 116, bevel gear 114 rotates about (and independently of) shaft 112. As bevel gear 114 rotates, planetary gear set 118 is engaged (for low speed operation) or disengaged (for high speed operation) by movement of the collar assembly 122 between a first position and a second position. If collar assembly 122 is in the first position (shown also in FIG. 9) to define a first speed of axle shafts 102 (e.g., a low speed or rate of rotation of axle shafts 102 for each rotation of bevel gear 116), bevel gear 114 and hub 144 couple to and engage planetary gear set 118 and splined section 120 via collar assembly 122 to rotate shaft 112 and in turn gear 110, gear 106, and axle shafts 102. If collar assembly 122 is in a second position (shown also in FIG. 8) to define a second speed of axle shafts 102 (e.g., a higher speed or rate of rotation of axle shafts 102 for each rotation of bevel gear 116), bevel gear 114 couples to and engages splined section 120 via hub 144 and collar assembly 122 without engaging (i.e. bypassing) planetary gear set 118 to rotate shaft 112 and in turn gear 110, gear 106, and axle shafts 102, while planetary gear set 118 remains idle.

Referring again to FIGS. 5-9, operation of transmission 104 is discussed more particularly. According to the illustrated embodiments, planetary gear set 118 includes a sun gear 128, planetary gears 136, a rotatable carrier 130, and a ring gear 132 arranged to define an annulus. When collar assembly 122 is shifted (e.g. slid, etc.) into the first position (shown as a "low speed" position in FIG. 9), collar 134 is rotated as internal teeth 135 engage the outer splines 145 of hub 144 (see FIGS. 6-8). External teeth 137 of collar 134 engage and rotate sun gear 128, the sun gear 128 having a set of external gear teeth 129. Gear teeth 129 of sun gear 128 turns planetary gears 136, which travel around ring gear 132 and turn carrier 130 at a rate of speed slower than the rotation rate of bevel gear 116. Teeth 131 on an internal surface of carrier 130 engage external teeth 139 on second collar 140 to rotate the second collar 140, which is configured to independently rotate about collar 134 while engaging and rotating splined section 120 via teeth 141. Splined section 120 engages splines 142 of shaft 112 thus rotating shaft 112, gear 110, gear 106 and differential 108 and axle shafts 102.

According to one exemplary embodiment, the total reduction ratio between the electric motor that drives bevel gear 116 and differential 108 when transmission 104 is in a first or "low speed" position may be within a range of approximately 50:1 and 75:1, and more particularly, approximately 61:1.

When collar assembly 122 is slid into the second position (shown as a "high speed" position in FIG. 8), the external teeth 137 of collar 134 are shifted out of engagement with sun gear 128 (i.e. sun gear 128 is idle), but the internal teeth 135 of collar 134 remains engaged with the outer splines 145 of hub 144 and also now engage and rotate splined section 120. Splined section 120 engages splines 142 of shaft 112 thus rotating shaft 112, gear 110, gear 106 and differential 108 and axle shafts 102 at a rate of speed greater than when collar assembly 122 is in the first position, while bypassing the planetary gear set 118.

According to one exemplary embodiment, the total reduction ratio between the electric motor that drives bevel gear 116 and differential 108 when transmission 104 is in a second or "high speed" position may be within a range of approximately 15:1 and 30:1, and more particularly, approximately 22:1.

Referring further to FIGS. 7-9, transmission 104 is shown in neutral, high, and low positions, respectively. Bevel gear 114 is coupled (shown for example by bolts, etc.) to hub 144 having a splined outer surface 145, which transfers power from the bevel gear 116 to collar 134. As bevel gear 114 rotates about shaft 112, splined hub 144 also rotates about and independently from shaft 112, thus engaging internal teeth 135 of internal collar 134 and rotating collar 134. Collar assembly 122 is shifted or slid into one of a neutral, first (or low speed), or second (or high speed) position by a shift mechanism 150. Collar assembly 122 may be moved between any of the positions by a single shift operation. According to various exemplary embodiments, shift mechanism 150 may be operated manually by a vehicle operator or automatically according to predetermined conditions (e.g. a software routine, etc.). Differential 108 may be locked to remove torque biasing and lateral movement by a differential lock 152.

When collar assembly 122 and transmission 104 are in the neutral position of FIG. 7 (shown as a "mid" or "neutral" position), the external teeth 137 of collar 134 do not engage sun gear 128 and the internal teeth 135 of collar 134 do not engage splined section 120. Therefore, planetary gear set 118 remains stationary. Further, because collar 134 engages only the outer splined portion 145 of hub 144 (via teeth 135) and the because the second collar 140 engages only the splined section 120 (via teeth 139) and because first collar 134 and second collar 140 are rotatable independently of one another, there is no engagement point with the shaft 112. Thus, none of splined section 120, shaft 112, gear 110, gear 106, differential 108, or axle shafts 102 are driven by the bevel gear 116.

When collar assembly 122 and transmission 104 are shifted to (or are in) the second or high speed position of FIG. 8 (shown as shifted toward end 126 of shaft 112), external teeth 137 of collar 134 do not engage the internal teeth 127 of sun gear 128, but internal teeth 135 remain in engagement with the outer splines 145 of hub 144 and now also engage splined section 120. Splined section 120 engages splines 142 of shaft 112 and thus power is provided in a high speed arrangement from bevel gear 116, to bevel gear 114, to splined hub 144, to collar 134, to splined section 120, to shaft 112, to gear 110, to gear 106, to differential 108 and to axle shafts 102 at a higher speed than when in the first (or low speed) position, while the planetary gear set 118 is bypassed and stationary (to avoid "parasitic" power losses, etc.).

When collar assembly 122 and transmission 104 are shifted to (or are in) the first (or low speed) position of FIG. 9 (shown as shifted away from end 126 of shaft 112), the planetary gear set 118 is engaged. Collar 134 does not directly engage splined section 120, but internal teeth 135 engaged the outer splines 145 of hub 144 and external teeth 137 engage internal teeth 127 of sun gear 128 to rotate the sun gear. As described above, external gear teeth 129 of sun gear 128 engages planetary gears 134 to rotate carrier 130 relative to ring gear 132. Internal teeth 131 on carrier 130 engages the external teeth 139 on second collar 140 to rotate second collar 140 about (and independently from) collar 134, whereby teeth 141 on second collar 140 engage and rotate splined section 120. Splined section 120 engages splines 142 of shaft 112 and thus power is provided to shaft 112, gear 110, gear 106, and differential 108 at a lower speed than when in the second or high position. Accordingly, in the first (or low speed) position, power is provided in a low speed arrangement from bevel gear 116, to bevel gear 114, to splined hub 144, to collar 134, to sun gear 128, to planetary gears 136, to carrier 130, to second collar 140, to splined section 120, to shaft 112, to gear 110, to gear 106, to differential 108 and to axle shafts 102 at a lower speed than when in the second (or high speed) position, due to engagement with the planetary gear set 118.

According to any exemplary embodiment, the components of the vehicle transmission as shown and described are arranged in a compact and efficient manner so that the number of rotating components is minimized, and the components "fit" within the space or volume provided by traditional axle housings and may be used with various types of vehicle suspensions. The vehicle transmission as shown and described is intended to provide flexibility in adapting the transmission to various vehicles, and is adaptable for use in retrofit applications with vehicles having conventional drive systems.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A transmission comprising:
   a first gear;
   a second gear fixed to a shaft proximate a first end of the shaft and the second gear engaging the first gear;
   a bevel gear rotatably supported on the shaft and configured to engage a power input gear;
   a hub fixed to the bevel gear for concentric rotation about the shaft; the hub having a splined outer section;
   a planetary gear set comprising a sun gear and a carrier arranged concentrically about the splined outer section;
   a splined section fixed to the shaft proximate a second end of the shaft; and
   a collar assembly comprising a first collar having internal teeth and external teeth and a second collar having internal teeth and external teeth, the first collar and the second collar axially coupled together and independently rotatable relative to one another, the collar assembly slidably engageable with the splined section and the splined outer section.

2. The transmission of claim 1 wherein the collar assembly is slidable between a first position to define a first speed of the first gear, and a second position to define a second speed of the first gear.

3. The transmission of claim 2 wherein the collar assembly, in the first position, is positioned so that the internal teeth of the first collar engage only the splined outer section of the hub and the internal teeth of the second collar engage only the splined section.

4. The transmission of claim 3 wherein the collar assembly, in the first position, is positioned so that the external teeth of the first collar engage the sun gear and the external teeth of the second collar engage internal teeth on the carrier.

5. The transmission of claim 4 wherein the first position is a low speed position.

6. The transmission of claim 2 wherein the collar assembly, in the second position, is positioned so that the internal teeth of the first collar engage both the splined outer section of the hub and the splined section, and the internal teeth of the second collar engage the splined section.

7. The transmission of claim 6 wherein the collar assembly, in the second position, is positioned so that the external teeth of the first collar are disengaged from the sun gear and the external teeth of the second collar are disengaged from the carrier, so that the planetary gear set remains stationary.

8. The transmission of claim 1, wherein the collar assembly is movable to a third position corresponding to a neutral position, where the internal teeth of the first collar engage only the splined outer section of the hub and the internal teeth of the second collar engage only the splined section, and the external teeth of the first collar are disengaged from the sun gear.

9. The transmission of claim 1, wherein the first gear is coupled to a differential for an axle for the vehicle.

10. The transmission of claim 1 wherein the splined outer section of the hub and the splined section are axially alignable with one another.

11. The transmission of claim 2 wherein the collar assembly is movable between the first position and the second position by a single shift operation.

12. A two speed power transmission for a hybrid drive vehicle, comprising:
    a bevel gear configured to provide power to a shaft of the vehicle;
    the bevel gear rotatably engaged with a collar assembly;
    a planetary gear set selectively engageable with the collar assembly;
    the collar assembly comprising a first collar and a second collar, the first collar and the second collar axially coupled together and independently rotatable relative to one another, the collar assembly slidable between a first position to engage the planetary gear set and rotate the shaft at a first speed, and a second position to disengage the planetary gear set and rotate the shaft at a second speed;
    wherein the planetary gear set comprises a sun gear and a carrier, and when the collar assembly is in the first position, the first collar engages the sun gear and the second collar engages teeth on the carrier.

13. The transmission of claim 12 wherein the first collar and the second collar rotate at different speeds relative to one another.

14. The transmission of claim 12 wherein when the collar assembly is in the second position, the first collar and the second collar are disengaged from the planetary gear set and rotate at substantially the same speed.

15. The transmission of claim 12 wherein the first collar and the second collar each have internal teeth and external teeth.

16. The transmission of claim 12 further comprising at least one flange on one of the first collar and the second collar, the flange rotatably engaged in a groove in the other of the first collar and the second collar.

17. A multi-speed power transmission for a hybrid drive vehicle, comprising:
    a power output source;
    a shaft coupled to one or more pairs of wheels of the vehicle;
    a planetary gear set concentrically disposed about the shaft;
    a collar assembly coupled to the power output source and concentrically disposed about the shaft and comprising a first collar and a second collar, the first collar and the second collar axially coupled together and independently rotatable relative to one another, the collar assembly slidable between a first position to engage the planetary gear set and rotate the shaft at a first speed, and a second position to disengage and bypass the planetary gear set and rotate the shaft at a second speed;
    wherein the planetary gear set comprises a sun gear and a carrier having internal teeth, and the first collar and the second collar comprise external teeth and internal teeth.

18. The transmission of claim 17 wherein the first speed is a low speed and the second speed is a high speed.

19. The transmission of claim 17 further comprising a neutral position between the first position and the second position where the planetary gear set is disengaged and the first collar rotates in response to the power input source, and the second collar and the shaft remain stationary.

20. The transmission of claim 17 wherein the external teeth of the first collar engage the sun gear and the external teeth of the second collar engage the internal teeth of the carrier when the collar assembly is in the first position.

21. The transmission of claim 17 wherein the internal teeth of the first collar are disengaged from the shaft when the carrier assembly is in the first position.

22. The transmission of claim 17 wherein the internal teeth of the first collar are engaged with the shaft when the carrier assembly is in the second position.

23. A multi-speed axle comprising:
    an input shaft;
    an output shaft mechanically coupled to a differential;
    a planetary gear set including a sun gear and a carrier; and
    a coupling which is slidably engageable with the input shaft, the output shaft, the sun gear and the carrier, wherein the coupling fixes the input shaft to the output shaft when disengaged from the sun gear and carrier, and permits relative rotation of the shafts when engaged with the sun gear and carrier.

24. A two speed power transmission for a hybrid drive vehicle, comprising:
    a bevel gear configured to provide power to a shaft of the vehicle;
    the bevel gear rotatably engaged with a collar assembly;
    a planetary gear set selectively engageable with the collar assembly;
    the collar assembly comprising a first collar and a second collar, the first collar and the second collar axially coupled together and independently rotatable relative to one another, the collar assembly slidable between a first position to engage the planetary gear set and rotate the shaft at a first speed, and a second position to disengage the planetary gear set and rotate the shaft at a second speed;
    wherein when the collar assembly is in the second position, the first collar and the second collar are disengaged from the planetary gear set and rotate at substantially the same speed.

25. A two speed power transmission for a hybrid drive vehicle, comprising:

a bevel gear configured to provide power to a shaft of the vehicle;

the bevel gear rotatably engaged with a collar assembly;

a planetary gear set selectively engageable with the collar assembly;

the collar assembly comprising a first collar and a second collar, the first collar and the second collar axially coupled together and independently rotatable relative to one another, the collar assembly slidable between a first position to engage the planetary gear set and rotate the shaft at a first speed, and a second position to disengage the planetary gear set and rotate the shaft at a second speed; and at least one flange on one of the first collar and the second collar, the flange rotatably engaged in a groove in the other of the first collar and the second collar.

* * * * *